SWITCHING SYSTEM FOR OUTPULSING ON PBX TRUNKS

Filed Nov. 28, 1962 4 Sheets-Sheet 1

INVENTORS : T.V. BURNS
E.L. ERWIN
G.J. KRALL
E.D. MASUCCI
C.J. VINCENT
BY William F. Simpson
ATTORNEY

SWITCHING SYSTEM FOR OUTPULSING ON PBX TRUNKS

Filed Nov. 28, 1962 4 Sheets-Sheet 2

SWITCHING SYSTEM FOR OUTPULSING ON PBX TRUNKS

Filed Nov. 28, 1962 4 Sheets-Sheet 4

United States Patent Office 3,264,415
Patented August 2, 1966

3,264,415
SWITCHING SYSTEM FOR OUTPULSING ON PBX TRUNKS

Thomas V. Burns, Etna Township, Licking County, Ohio, Edson L. Erwin, Towaco, N.J., and George J. Krall, Eugene D. Masucci, and Charles J. Vincent, Columbus, Ohio, assignors to Bell Telephone Laboratories, Incorporated, New York, N.Y., a corporation of New York
Filed Nov. 28, 1962, Ser. No. 240,558
19 Claims. (Cl. 179—18)

This invention relates to an improvement in telephone switching systems and more particularly to an improvement in telephone switching systems of the common control type. More particularly, this invention relates to improved circuits and apparatus for the outpulsing of control or dial signals for further control of automatic telephone switching equipment at other switching centers such as central offices, community dial offices and private branch exchanges.

In the crossbar type of switching systems commonly employed today, such as disclosed in A. J. Busch Patent 2,585,904 granted February 19, 1952, provision has been made for the outpulsing of control or switching information both when the crossbar switching system is employed as an originating office and when it is employed as a tandem center. In both of these arrangements when it is desired to outpulse, the outpulsing must take place from the trunk link frame. In order to accomplish this the outpulsing sender is attached to the outgoing trunk by the marker. The sender is also set by the marker and thereafter controls the signals transmitted over the outgoing trunk. With this arrangement it is necessary to provide a double termination for trunks which may be used on tandem calls. These trunks must be terminated both on the line link side of the switching network and on the trunk link side. With this arrangement it is impossible to outpulse to private branch exchanges because the trunks to these exchanges are all connected to the line link side of the switching network.

The system disclosed in the above-identified patent is arranged to hunt over a plurality of trunks to the private branch exchange to find an idle one in response to a call directed to the PBX. This system, however, is not arranged to permit direct dialing of any of the private branch exchange extensions from any subscriber or incoming trunks connected to the main exchange. Neither is it possible to employ the numerical part of the called number to select a route relay and then an idle path in the selected route to any private branch exchange. Such selection of route relays is under control of the office portion of the called number or station designations.

It has also been proposed to extend the PBX trunks to a tandem switching center in order that the PBX stations may be directly dialed by outside calling telephone subscribers. This arrangement requires the reserving of one or more central office codes or designations for the exclusive use of PBX stations. It also requires the PBX lines or trunks to be extended to a tandem switching center. Thus, these trunks become long, expensive, and uneconomical.

Figure 1:
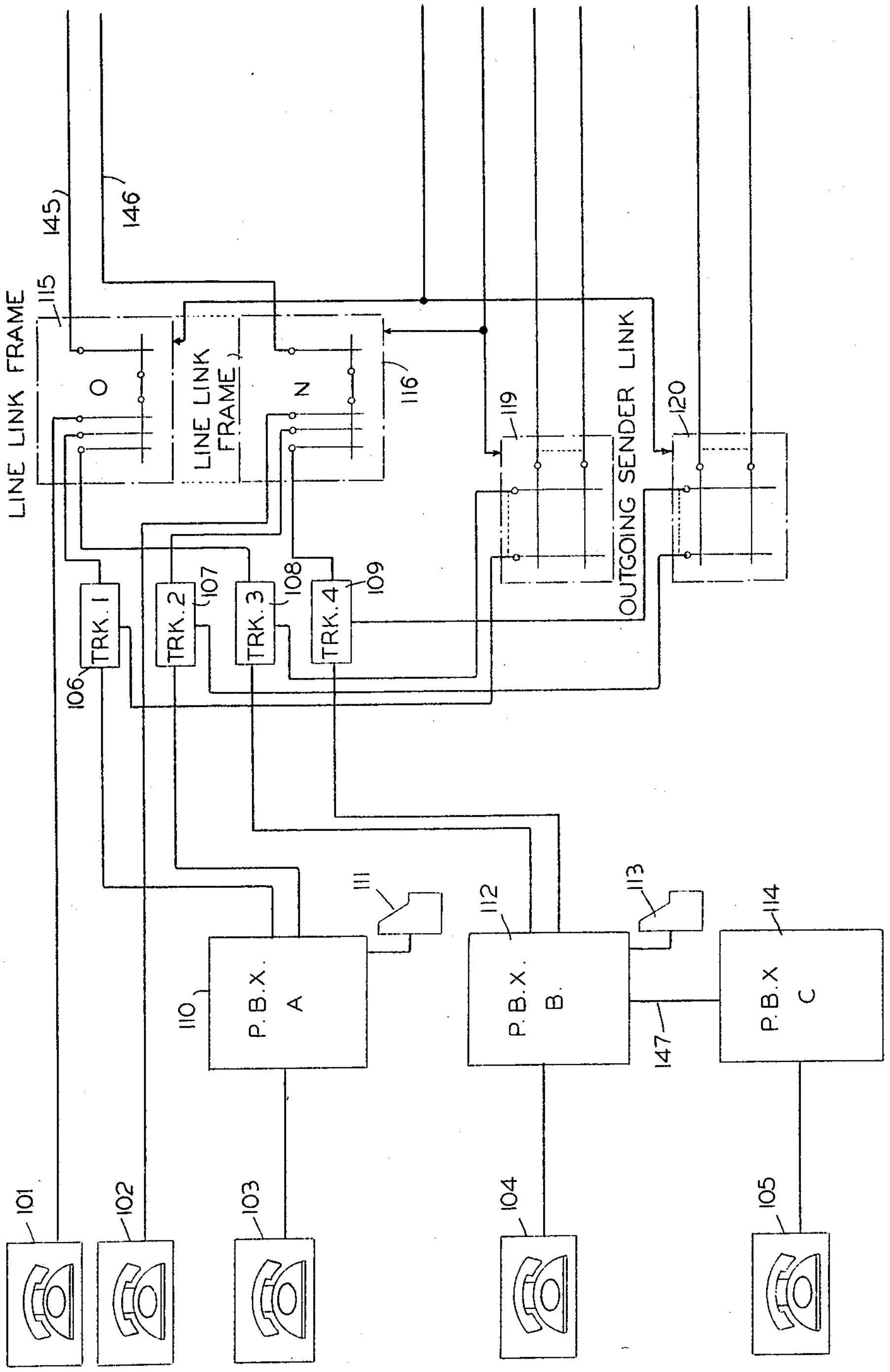

Furthermore, in this system as shown in FIG. 1 of Patent 2,848,543 granted to R. N. Breed et al. on August 19, 1958, the outpulsing is from a sender connected to the incoming trunks connected to the trunk link frame through the switching network.

In Patent 3,149,206 granted September 15, 1964 to W. H. Scheer, an arrangement is disclosed wherein the numerical part of the calling station designation may be employed to select a route or route relay and the marker thereafter selects an idle path in the designated route. This arrangement, however, causes the outpulsing signals to be transmitted by the usual sender connected to an outgoing trunk which terminates on the trunk link side of the switching network.

Copending patent application of D. R. Fisher, E. J. Gesing, F. H. Koster and R. J. Kowalinski, Serial No. 191,507, filed May 1, 1962, discloses an arrangement in which individual stations assigned to a subscriber similar to so-called PBX stations may be individually called and dialed by subscribers connected to the central switching system or from incoming trunks from other subscribers connected to other switching stations. This arrangement does not permit the transmission of outgoing dial pulses from the central switching system to an automatic PBX or to another type of community dial or other type of automatic switching system.

It is an object of the present invention to provide an improved outdialing arrangement which will permit the transmission of dial pulses to automatic switching systems, such as a PBX, from the line link side of the switching network. With such an arrangement the trunks to and from the PBX may be either one-way or two-way trunks and terminate only on the line link side of the switching network.

In the system such as described above, when an outgoing line from the line link side is found to be idle and seized, the equipment is arranged to apply ringing current to this line to call the called subscriber. This ringing current is applied through a ringing switch which is set by the marker at the time the connection to the line is established.

In accordance with the arrangements of our invention where it is desired to outpulse on the outgoing path from the line link side, ringing current is not transmitted upon the seizure of such a path. Instead, outgoing dial or other type of control signals must be transmitted over the seized path.

In accordance with another aspect of our invention, an additional level or control condition has been provided on the ringing switch which will set the trunk circuit so as to indicate a charge upon answering without applying ringing and thus prevent transmission of ringing current over the selected path.

When it is desired to outpulse calling signals to automatic PBX systems from the line link side of the switching network in accordance with our invention, it is necessary to provide means for selecting a large group of route relays, one or more for each PBX. In order to accomplish this selection in existing systems the translating or number group circuits must be provided with additional equipment.

It is an object of this invention to provide additional translation equipment in the number group circuits for securing a large plurality of additional translations from the usual ringing combination translations obtained in the systems described in the above-identified patent and patent applications.

In accordance with a feature of the invention, the tens block relays are augmented by additional relays which are cross-connected so that different translations may be made for the lines in such groups of ten. The same translation need not be made for all of the lines in the group.

When a large group of automatic PBX's must be served from a given switching center, it is desirable that the trunks or lines extending to these PBX's be distributed more or less uniformly over the various line link frames and outgoing sender groups.

Another object of this invention is to provide an improved sender group busy circuit which cooperates with the marker hunting circuits such that if all senders of a sender group become busy then all of the lines served by this sender group will likewise test busy to the marker hunting circuits so that the marker will be unable to select any such lines. In other words, the marker selects only those lines which have an idle sender in its associated sender group available for use for outpulsing over the selected line or trunk circuit.

Another object of this invention is to provide a plurality of route relays which are selected by different listed or directory numbers such as the listed directory PBX number and any of the listed directory numbers of individual PBX stations.

A feature of this invention is to employ the same group of trunks to the PBX both when it is desired to reach the PBX operator and when it is desired to reach an individual station of the PBX. In addition, when the PBX is provided with tie lines to one or more other automatic PBX systems it is desired to directly call stations connected to these other PBX systems over the same group of trunks as employed to call the PBX operator or the other stations of the first PBX.

As in the past, the various PBX systems connected to the main switching station are provided with a number of trunks so it is necessary for the marker to trunk hunt over these trunks to find an idle one.

When it is desired to directly call the PBX stations by means of signals transmitted from the central switching station, then each of the PBX stations which it is desired to so call must be assigned to a station identification or directory number of the same kind as employed to identify the individual subscribers' stations connected to the main switching station. It is also necessary to provide a PBX identification number which may be called when the subscriber does not know the numbers of the individual PBX stations. In the past, the various trunks to the individual PBX's, in effect, were assigned subscriber numbers which rendered a subscriber's number unavailable for use by an individual subscriber.

In accordance with this invention the trunks do not require a subscriber's number or render any number unavailable to an individual or a PBX subscriber.

In order to provide this service, additional and improved translating equipment responsive to dial numbers is required in the crossbar central office in accordance with aspects of our invention. Where maximum flexibility is required, or where the number of trunks to the PBX is small, the directory number of the PBX station or operator is employed to select a route relay. When the marker connects to the number group to receive a translation of this number the number group will indicate to the marker the number of the digits to be outpulsed. Thus, a single route relay may be employed for a given PBX if the PBX number ends in 0 and the number group instructs the marker to transmit only this last digit. If any of the other stations of this PBX are called, then the number group will instruct the marker to outpulse the required number of digits to actuate the PBX switching equipment. In addition, the same route relay will be operated.

This route relay will then direct the marker to the first trunk of the group extending to the desired PBX and instruct the marker to trunk hunt over the group of trunks extending to this PBX to find an idle trunk. In selecting an idle trunk and then obtaining a translation of a line equipment or location number to the selected idle trunk, the marker may be directed by the route relay to the same number group as before, to a different number group, or to an auxiliary number group. In case the trunks do not require or utilize subscriber's numbers in the main switching system, the marker must be directed to an auxiliary number group to find an idle trunk and obtain its location.

Where it is desirable to prefix one or more different digits ahead of the number outpulsed from the central switching station then a different route relay must be provided for each of the different kinds of treatment required of calls to a given PBX. Thus, a route relay may be required for prefixing the desired digit to reach a selected tie line after which the proper number of digits will be outpulsed. The route relay may also determine the number of digits to be outpulsed.

For large PBX's the route relay may be selected by the directory number directly either by the office code, or in place of selecting a number group by means of the office code and thousands digit of the called number. The route relay may be also selected in response to the office code, and the thousands and hundreds digits. Under all of these circumstances the same number of digits must be outpulsed to all the stations designated by such numbers.

Figure 2:
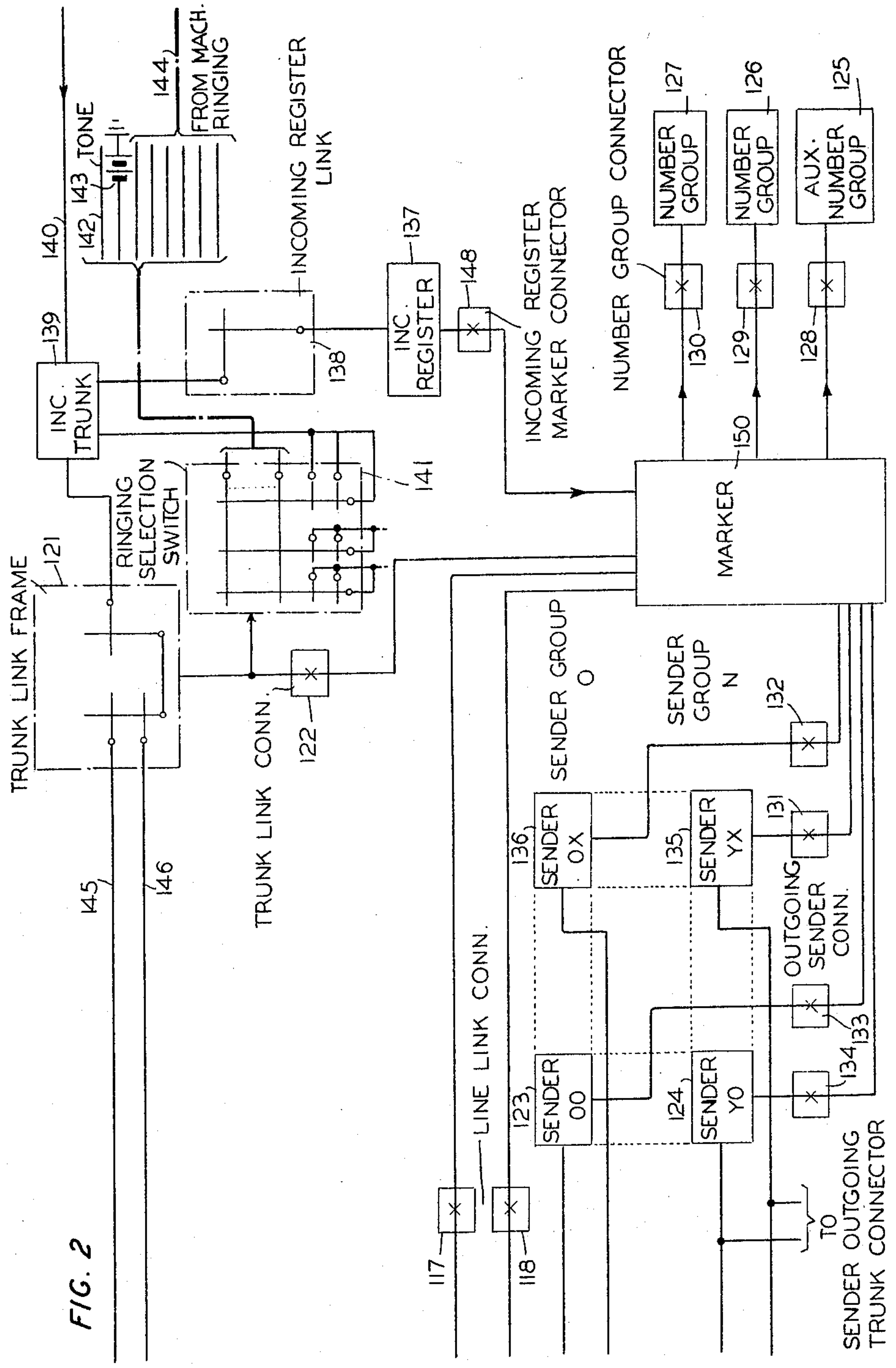
Figure 3:
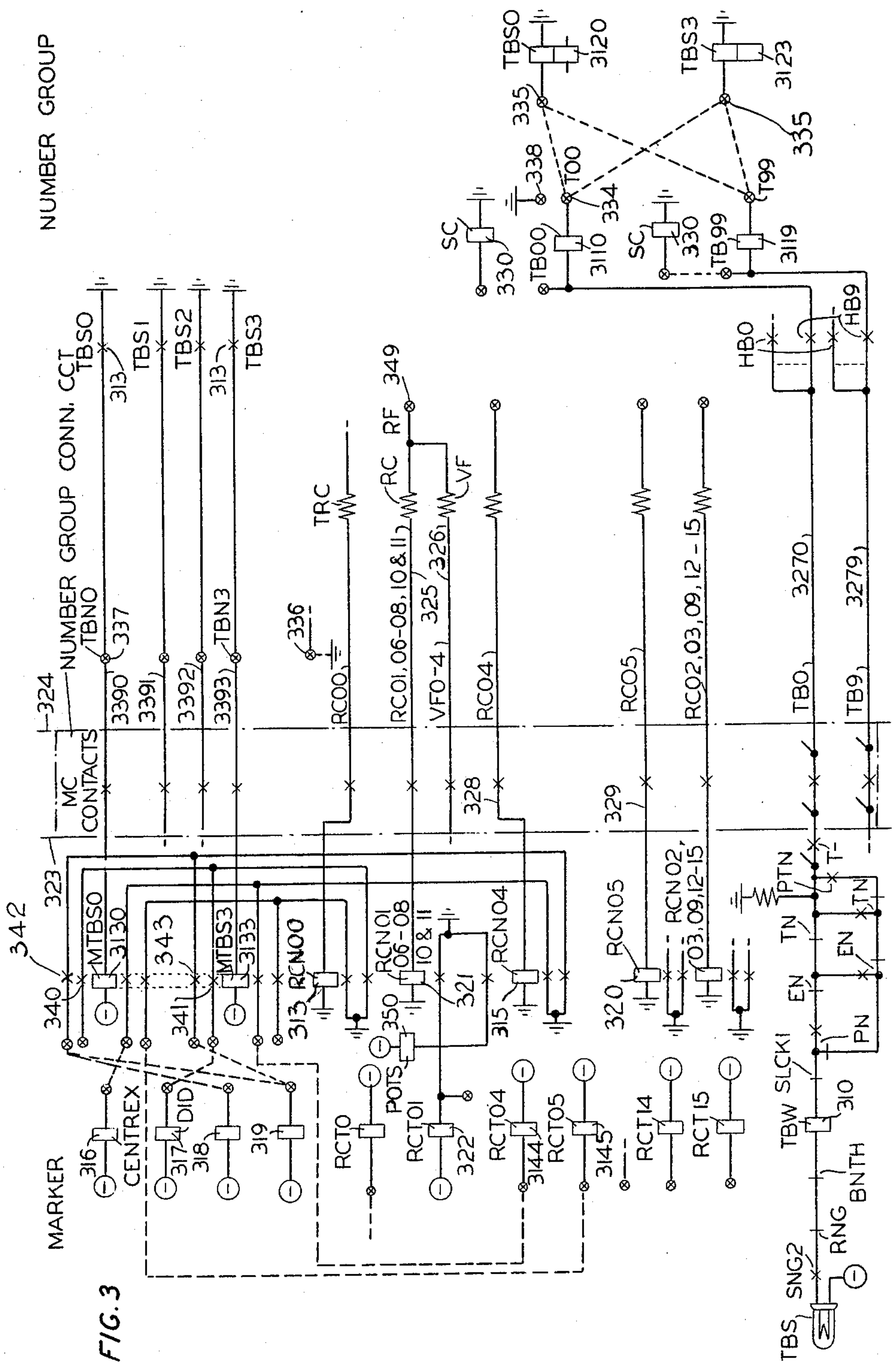
Figure 4:
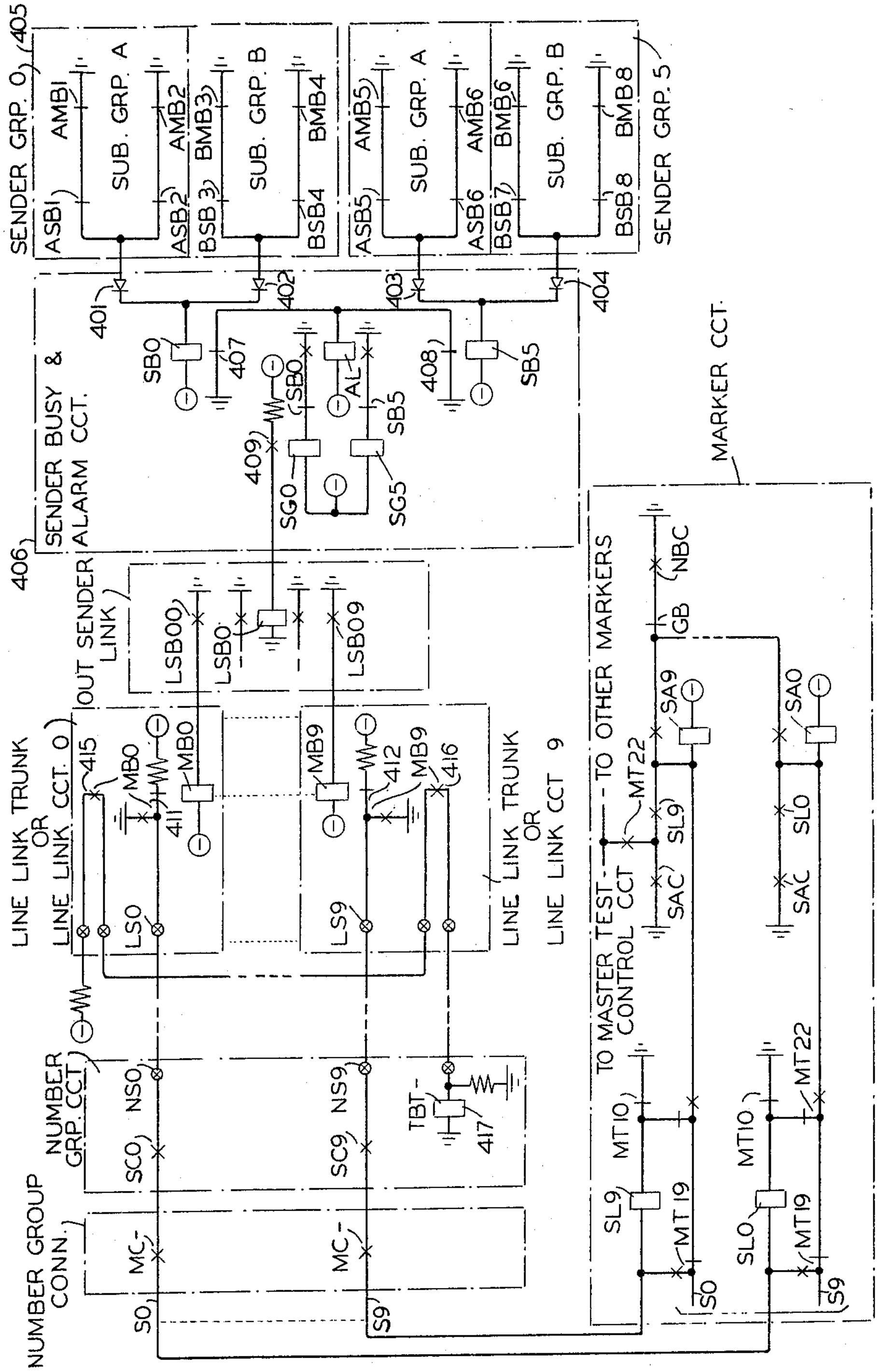

A complete understanding of these and other objects and features of our invention may be gained from a consideration of the following description when read with reference to the attached drawing in which:

FIGS. 1 and 2 depict an illustrative embodiment of our invention incorporated in a crossbar switching system;

FIG. 3 shows the circuit details of the improved translating arrangements in accordance with one embodiment of our invention and employed to secure necessary information for the marker to enable it properly to hunt for PBX trunks and also so that the marker can condition the outsenders properly to transmit the desired calling signals from the line link terminals over the PBX trunks to the PBX switching equipment; and FIG. 4 shows circuit details of the sender-group-busy circuit in accordance with one embodiment of our invention and the manner in which these circuits cooperate with the marker to prevent the selection of an idle PBX trunk by the marker when this PBX trunk is served by the senders of a sender group which are all busy.

Turning now to the drawing, FIGS. 1 and 2 show in outline form the portions of the crossbar system employed in terminating incoming calls as modified in accordance with one specific embodiment of this invention.

The above-identified Busch patent discloses an exemplary crossbar switching system and describes the operations therein required to complete an intraoffice and an outgoing call. The circuit operations involved in an incoming call are described in Patent 2,535,661 to A. O. Adam, Jr. and R. C. Avery, December 26, 1960. Patent 2,587,817 granted to A. J. Busch and H. J. Michael on March 4, 1952 discloses the circuitry and describes the operations involved in a tandem call in such a crossbar switching system. The foregoing patents are hereby made a part of this application as if fully included herein.

FIGS. 1 and 2 specifically depict the organization of one embodiment of our invention to handle incoming calls and the following description is directed thereto. This invention and the embodiment thereof described herein applies in a similar manner to intraoffice calls, including the types of calls described in the above-identified patent application of D. R. Fisher et al. and in the patent of W. H. Scheer.

The following description describes the operation of the circuits in accordance with this invention when the calls are directed to automatic PBX switching systems which are assumed to be of the step-by-step type. The invention, however, is equally applicable for use with PBX switching systems of other types including crossbar PBX systems.

The invention is also applicable to tandem operation of the central crossbar switching system and may be employed in place of the tandem operation from the trunk link frame as described in the above-identified Patent 2,587,817. Reference is also made to an article entitled "No. 5 Crossbar Marker" by A. O. Adam, beginning on page 502 of the Bell Telephone Laboratories Record for November 1950; to an article entitled "Senders for No. 5 Crossbar" by L. T. Anderson, beginning on page 385 of the Bell Telephone Laboratories Record for November 1949; to an article entitled "Number Group Frame for No. 5 Crossbar" by O. J. Morzenti, beginning on page 298 of the Bell Telephone Laboratories Record for July 1950; and to an article entitled "Ringing Selection in No. 5 Crossbar" by M. C. Goddard, beginning on page 168 of the Bell Telephone Laboratories Record for April 1950. These articles are also hereby made a part of this application by reference as if fully included herein.

FIGS. 1 and 2 are similar to FIG. 5 of the above-identified Adam article and are directed to the portions of the crossbar switching system involved in completing incoming calls from the distant switching center. These circuits also cooperate in a similar manner for intraoffice calls and calls to community dial offices and other switching offices in addition to the PBX switching centers shown in the drawing.

The incom trunk from the distant central office is represented by the line 140. This trunk circuit may include open wire lines, cable conductors, physical and phantom paths of composite systems, or voice channels of carrier, radio, coaxial cable, and waveguide systems. This trunk terminates in the incoming trunk circuit 139. The incoming trunk 139 is connected to trunk terminals on the trunk line frame 121. This trunk has a connection extending to an incoming register link 138 which causes an incoming register, such as 137, to be connected to the trunk for receiving the incoming signals representing the called party's station. These incoming signals may be of any suitable type and code including dial pulse, multi-frequency signal, revertive pulses, call indicator pulses, permutation code pulses, etc. When these signals have been received, the incoming register causes an incoming register marker-connector 148 to be operated to connect the incoming register with the marker 150. The incoming signal information is then transferred to the marker and the marker 150 then causes a connection to be set up through the trunk link frame 121 and line link frame 115 or 116 to a called subscriber, such as 101 or 102 if the incoming call is directed to an individual subscriber or to a subscriber on a party line.

In setting up this connection, the marker 150 causes the various connector links, such as the trunk link connector 122, and one of the line link connectors 117 or 118 to be operated. The marker also causes a number group connector, such as 129 or 130, to be operated to connect a number group, such as 126 or 127, to the marker. As set forth in the above-described article of O. J. Morzenti, the number group circuit is provided for each thousand lines. This number group circuit is selected by the marker in accordance with the office code, that is, the first three digits, and the thousands digit of the subscriber's number. As described in the above-identified articles and patents, a marker group may respond to a number of different office codes in addition to the numerical parts of the subscriber directory or identification.

The number group circuit is employed to translate the directory number of the called party to the line equipment number which designates the location of the called line on some one of the line link frames where it terminates.

In FIGS. 1 and 2 only one of many similar circuits in a crossbar office is shown. Thus, only one exemplary incoming trunk 140 and one trunk circuit 139 have been shown. A large plurality of such circuits is employed in a crossbar switching system, as is known in the art.

Similarly, only one register circuit and only one marker circuit and related connector circuits are shown. In addition, only one trunk link frame 121 is shown and one trunk link frame connector 122. One ringing selection switch 141 is shown but many such circuits and switches are employed in a typical switching system. The ringing selection switch 141 is set by the marker 150 so that the proper type of code ringing signals is applied to the called line and so that the proper party will be called in case of full selective ringing.

Two representative line link frames 115 and 116 are shown together with their related line link connectors 117 and 118. Each line link frame is shown having a subscriber's station 101 and 102 respectively connected thereto. These subscribers' stations are merely representative and represent one of a large plurality of such lines and stations connected to each of the line link frames. The line link frame 115 is interconnected with trunk link frame 121 by the trunk connection 145 while the line link frame 116 is interconnected with the trunk link frame 121 by the connection 146. The trunk link frame 121 is interconnected with other line link frames in the usual manner as described in the above-identified patents and publications, and the line link frames are likewise interconnected with other trunk line frames in the usual manner.

In addition, in FIG. 1 three PBX switching centers 110, 112 and 114 are represented. The switching centers 110 and 112 are shown connected to the central office by groups of trunks while the PBX 114 is shown connected to the PBX 112 by means of tie line 147. The PBX 110 is interconnected with the central switching station by two representative trunks which terminate in trunk terminations 106 and 107. The PBX 112 is similarly shown connected to the central switching system by two representative trunks which terminate in trunk terminations 108 and 109. The number of trunks provided for each PBX is determined by the amount of telephone traffic between the respective PBX and the central switching system.

In accordance with the prior art such as listed above, calls are directed to the PBX or any PBX station and directed to an operator or an operator's position in the PBX and the operator will then dial or key the number of the PBX station to be connected to the incoming call. In extending a call to such a PBX the marker 150 will operate in its normal fashion for individual calls up to the time it becomes connected to a number group circuit. The number group circuit will then indicate that the call is directed to a PBX whereupon the marker 150 will advance and cause the trunks to the desired PBX to be searched. This is called hunting for an idle trunk. When an idle trunk is found the marker will obtain the equipment number of the trunk which represents the location of the trunk on the switching frames and then will establish a connection to this trunk and ringing current will usually be applied thereto by the ringing switch 141 which is set by the marker. Trunk hunting is accomplished in the marker in two different ways. For small PBX's having a small number of trunks the marker such as 150 individually scans or hunts over these trunks in groups of ten for an idle trunk. In large PBX's having a large number of trunks this arrangement is too slow and unduly prolongs the holding time of the marker. For such large groups of trunks to large PBX's the marker such as 150 is arranged to hunt over blocks or groups of trunks, usually in blocks of ten trunks. If all the trunks of a group are busy the marker will not connect to the sleeves of these trunks. Instead it will go to the next group until it finds a group in which some trunk is idle. Thereupon the marker such as 150 will connect to the sleeves of these ten trunks and scan or search for an idle trunk in the group and thereafter determine the equipment member or line location of this trunk and then extend the call to it.

In accordance with our invention the circuits are arranged so that calls directed to the PBX directory number will be extended automatically to an operator or attendant and calls directed to individual stations of the PBX will be extended to these stations without the intervention of an operator at the central switching point, or an attendant at the PBX. In order to accomplish these features we provide outsenders on the line link side of the switching system and arrange to connect these senders to the selected trunks extending to the PBX. We may employ the same senders as described in the above articles and patents for outgoing trunks or we may eliminate various features such as automatic message accounting features. These senders may be provided individual to the line link frames or they may be arranged in groups common with the senders serving the trunk link frames described in the above articles and patents.

In addition, we provide a flexible translation arrangement so that the trunks to a PBX may be readily located and the outsenders set to transmit the desired number of dial or calling signals over the selected trunks. Moreover, the ringing switch is set so that the ringing from the incoming trunk will be tripped and not transmitted through the switching network in the usual fashion. However, this trunk must be set so that charge indications will be obtained when the call is answered at the PBX.

In order to permit both individual and block trunk hunting, as described above, for the various trunks to the PBX stations without unduly increasing the marker holding time, we provide one or more route relays for each PBX. These route relays are selected by the various PBX numbers conveyed from the marker circuits to the number group circuits.

In accordance with the prior art, each PBX was given one directory number and this number would cause the PBX relay to be operated in the marker, which caused the marker to hunt over the various PBX trunks, and, when an idle trunk was found, the equipment number of this trunk was conveyed to the marker. Where this equipment number was obtained from the regular number group circuits, each trunk in effect requires or employs one of the available subscriber numbers of the switching center. The individual stations of the PBX do not require such a number.

When it is desired to directly dial or outpulse to the switching equipment at the PBX station from the central switching center, it is necessary to assign a directory number to each PBX and at times to each of the stations of the PBX. However, it is undesirable to assign directory numbers to the individual trunks extending from the main switching center to the PBX in most cases. Where sufficient numbers are available it is somewhat simpler to assign such numbers to the trunks extending to the PBX. It will be assumed first that PBX 110 has such numbers assigned to the various trunks and that the listed PBX number ends in 0. It is further assumed that, as is usual in PBX systems, if any station, such as 103, connected to the PBX wishes to call the PBX attendant, the subscriber at this station will dial a 0, or any other preassigned digit. Thus the PBX equipment directs the call to the PBX operator in response to this 0 transmitted to the switching equipment by the PBX station.

Now assume that a call is directed to the PBX by a subscriber outside the PBX dialing the directory number of PBX 110 which has a 0 for the last digit. When this number is received by the marker 150, for example, and transmitted to the number group circuit such as 126 or 127, the number group first translates the number to indicate that it is a PBX number that is to be outdialed but that only the last digit of this number is to be pulsed to the PBX. In addition, a route relay will be operated in response to this translation from the number group and thereafter the marker 150 searches the various trunks extending to the PBX and when an idle one is found extends the connection through the trunk link frame 121 and a trunk connection, such as 145 or 146, and then through the corresponding line link frame, such as 115, to a trunk, such as 106, extending to the PBX. In addition, the marker 150 will convey the last number only of the dialed or directory number of this PBX to a sender, such as sender 123, whereupon the sender will outpulse the 0 to the PBX station 110. In response to this 0, the switching equipment at the PBX will connect the incoming trunk to the PBX attendant position 111.

If, on the other hand, a call has been directed to the PBX station 103, the directory number of this PBX station will be dialed by the calling party. When this number is conveyed by the marker 150 to the number group 126, for example, a translation is obtained which causes a group or route relay to be operated indicating PBX 110. Under the assumed circumstances, where each of the numbers is a regularly assigned number in the switching system, the number group 126 will indicate that the last four digits, for example, of the called party's station identification or number are to be outpulsed to the step-by-step PBX switching equipment. The operation of the route relay will cause the marker 150 circuit to be connected to the sleeves of the trunks to this PBX and hunt for an idle trunk. When this is found the equipment number for this trunk will be obtained and a path established through the switching equipment from the incoming trunk 140 to trunk 106, for example, extending to the PBX 110.

The ringing switch 141 will be set so that no ringing current will be transmitted over this trunk at this time. Instead, battery 143 will be connected through the ringing switch to the trunk to, in effect, operate the ring trip relay and condition the trunk to respond to the various signals transmitted to it and through it. Then the marker will cause an idle sender, such as 123, of the sender group serving the line link frame 115, to be connected through the outgoing sender link, such as 119, to the outgoing trunk termination 106. The marker 150 will convey the last four digits of the called station to the sender 123 and thereafter the sender 123 will send suitable signals, such as dial pulse signals, or multifrequency signals or other types of calling signals, through the outsender link switch 119 and trunk termination 106 and trunk line to the PBX 110. PBX equipment 110 responds to these signals and causes a path to be established to the PBX station 103. When the called party answers, the supervision is relayed back to the incoming trunk circuit 139 in the usual manner, which causes or initiates a charging operation for the call.

When the marker has set up the connection, has caused the sender to be attached to the outgoing trunk, and has conveyed the necessary other information to the sender, the marker releases and becomes available for use in establishing other calls through the switching equipment. After the sender has outpulsed all of the digits, i.e, four under the assumed conditions, the sender becomes disconnected and is available for connection under control of a marker to other trunks to the PBX stations.

Less translation may be required where a large number of trunks go to a given PBX. Thus, if a thousand lines are connected to the PBX then the translation may be by means of the translation of the office code and the thousands digit. Under these circumstances, it is unnecessary to even employ the number group that is usually employed for translating all of these numbers. Instead, a route relay is operated in place of connections to the number group circuit.

In the above description it was assumed that the trunks and the individual stations, as well as the PBX number, all employ possible directory numbers at the main switching station. To reduce the number of these directory numbers required we have arranged the number group translation circuits to be more flexible and have provided auxiliary number group circuits. In addition, if it is desired not to employ or utilize an available directory number at the central switching station for each of the trunks extending to the PBX then it is desirable to provide one or more auxiliary number group circuits, such as 125, and cause the route relay selected by the dialed number to generate an additional number and convey this number to the marker, such as 150, so that the marker 150 will recycle and connect to the auxiliary number group 125 through the connector 128. The marker will then search for an idle trunk and when one is found, obtain the equipment number for this trunk from the auxiliary number group circuit 125. The number of digits to be outpulsed will again be obtained. Under these circumstances the usual number of digits to be outpulsed will be four. However, if the PBX is sufficiently small it may only accept two digits so that only the last two digits will be outpulsed.

The above-described operation is similar for medium size PBX's where a block of one hundred numbers may be employed for the PBX.

Where the number of stations in a PBX is small there may be only a few trunks and a few stations connected to the PBX. Under these circumstances it is desired to recognize each of the PBX numbers or stations on an individual basis. It is also desirable under these circumstances to have a route relay individual to the PBX for each of the different types of information to be outpulsed to the PBX.

First assume, for example, that it is desired to call the attendant at the attendant's station 113 of the PBX 112. Assume, further, that this PBX number does not end in 0.

When a subscriber dials this PBX, the marker 150 will be connected to one of the regular number group circuits, such as 127, and this number group circuit will indicate to the marker 150 that the call is to an automatic PBX and that none of the received digits are to be outpulsed but instead an arbitrary digit or number such as 0 is to be outdialed and a route relay will be operated. This route relay will, in turn, direct the marker 150 to an auxiliary number group circuit such as 125 so that the marker 150 can search for an idle outgoing trunk to the PBX 112. When desired this route relay, alternatively, may indicate that a 0 is to be outpulsed and that none of the dialed digits should be outpulsed following the 0. As a result, after the marker 150 finds an idle path leading to the PBX and causes a sender, such as 123, to be attached, the marker will cause the sender to outpulse the 0 which directs the call to the attendant's position or station 113. Thereafter, the attendant may respond to the call in any desired manner.

Assume now that some subscriber connected to the main switching station or to some other switching station wishes to place a call to some PBX station, such as station 104 connected to the PBX 112. Further assume that this station designation or number is listed in the telephone directory and that the calling subscriber knows the number and is permitted to dial it. The calling subscriber will dial this number in the usual manner and the various switching centers and circuits therein will respond in the usual manner to this number. Ultimately, this number is conveyed to the marker 150, for example, in the manner described above. At this time the marker will become interconnected with a regular number group circuit, such as 126 or 127, which will indicate to the marker 150 that the called number is a PBX station number which can be reached by direct outdialing from this switching center. As a result, a route relay will be operated. This route relay may be the same route relay as operated to direct a call to the attendant 113 at the PBX 112. At this time it is not desired to outpulse a 0. Instead, it is desired to outpulse the necessary number of digits to actuate the automatic switching equipment at the PBX station 112 to extend the call through the PBX switching equipment to the station 104. In the usual case two, three or four of the dialed digits will be outpulsed. The number group circuit will usually indicate the number of the dialed digits to be outpulsed. Alternatively, when desired, the route relay may indicate to the marker the proper number of dialed digits to be outpulsed. The route relay also directs the marker to trunk hunt in the proper group of trunks to the PBX 112 so that an idle trunk may be found to this PBX. In this case, as in the case of a call directed to the operator 113, the route relay causes the marker to trunk hunt over the same group of trunks extending between the PBX station 112 and the main crossbar switching system. However, since the inforamtion to be outpulsed is different, a different route relay must be operated for the two different kinds of calls.

As shown in the drawing, still another group of stations may be reached through PBX 112. As shown in the drawing, a tie line 147 extends between PBX 112 and a PBX 114. These two PBX's may be employed by the same customer in different locations or buildings. It is common to provide a tie line, such as 147, and permit stations at either of the PBX's, such as 104 or 105, to automatically call stations both at their own PBX and also stations at the other PBX. Thus, station 104 may call station 105, or station 105 may call station 104. In this case, either of these stations usually is required to dial an additional digit prior to the number designating the called station. Frequently this digit may be the same for both stations. In other cases, it may be a different digit. In accordance with our invention, it is desired to permit direct dialing to stations connected to the PBX 114, such as station 105. Under these circumstances, the directory number of the station 105 must be either listed in the telephone directory or known to a calling subscriber so that this subscriber may directly dial this PBX station. As before, the called station's number of identification is ultimately transmitted to a marker at a terminating central office, such as marker 150. At this time the marker will become connected with one of the number group circuits, such as 126. The marker then transmits the called station number to the number group circuit by operating various relays in the number group circuit. The number group circuit then translates this information and indicates to the marker that the called station is a PBX station which may be outdialed. As a result, the number group circuit causes an appropriate route relay, which is different from the route relay operated in response to the above-described calls, to be operated which directs the marker 150 to another number group circuit, which is usually an auxiliary number group circuit, such as 125. The marker then employs this auxiliary number group circuit to trunk hunt for an idle trunk extending to the PBX station 112. In this case, the route relay must also indicate to the marker the number of digits to be outpulsed to the PBX and also the character of an auxiliary digit to be outpulsed to the PBX preceding the digits of the directory number.

Thus, assume that the digit 7 is required to cause the PBX equipment 112 to select an idle one of the tie lines, such as 147, extending to PBX 114. In this case, the operated route relay will indicate to the marker 150 that 7 must be outpulsed followed by the proper number of dialed digits. The marker will then condition an outsender, such as 123, which is connected to the appropriate outgoing trunk to outpulse the 7 followed by the proper number of dialed digits. The sender 123 then outpulses these various digits.

The PBX equipment 112 responds to the first digit, 7 for example, and causes the call to be extended over the tie line 147. The PBX equipment and PBX 114 will then respond to the succeeding directory number digits outpulsed from the outgoing sender, such as 123, and cause the call to be extended to the desired PBX station, such as station 105.

Thus, in the case of PBX station 112 for the different kinds of calls or traffic conditions described above, two route relays will be required. Each of these route relays causes the marker to hunt over the same group of trunks extending between PBX station 112 and the central switching station. When an idle trunk is so located, it will be seized and the marker will establish a connection to this trunk. In addition, the marker causes an idle outsender to be attached to the selected trunk. Each of the route relays, however, directs the marker 150 to set the outsender in a different manner. The number group circuit which causes the first route relay to be operated causes the marker to set the outsender to pulse 0 for calls directed to the listed PBX number, which calls will be extended to the operator or attendant at position 113 at the PBX. In response to the second call assumed above, number group circuits in addition to causing the operation of the same route relay will cause the marker to direct the sender to outpulse the desired number of dialed digits so that the PBX equipment at station 112 automatically selects the desired called station, such as station 104, and causes the call to be extended to this station. The second route relay will direct the marker to set the outgoing sender to outpulse some other arbitrary digit, such as 7, followed by the proper number of dialed digits so that the PBX equipment 112 first selects a tie line, such as 147, and then the PBX equipment 114 causes the call to be extended to the desired PBX station, such as 105.

In the above description it has been assumed that the various calls were directed to attendants at PBX stations or to other stations connected to a PBX. The above type of outdialing is also applicable to other types of switching equipment which responds to dial pulses or other types of calling signals such as single frequency or multifrequency alternating-current signals and various other types of pulsing, such as revertive pulsing, call indicator pulses, or any other type of pulses or calling signals which may be employed to control automatic switching equipment.

The above-described operation is also applicable to extending calls to the usual types of telephone switching exchanges and may be used in place of the circuits and equipment usually provided at a crossbar automatic switching system and described in the above-identified Patent 2,587,817 relating to tandem calls.

The above new and different types of operation of the switching equipment require a large plurality of new and different translations to be obtained from the number group circuits. In addition, since it is desired to provide these new and different services in existing exchanges, it is necessary to readily obtain these new and different translations from the existing equipment without expensive and comprehensive changes or additions.

In accordance with this invention, these many new translations are obtained by expanding the translations which may be obtained from the various ringing combinations of translations. As described in the above-identified patents, the usual so-called No. 5 crossbar systems provide fifteen ringing translations. In the above-identified patent application of D. R. Fisher et al., certain of these ringing combinations, which were not commonly used, were employed to provide the necessary translations for using a portion of the central office equipment as a PBX switching center where the PBX station lines terminate directly in the No. 5 crossbar switching equipment. Such unused or little used ringing combinations do not provide nearly sufficient additional new translations required for the direct outpulsing to step-by-step and other types of switching systems in accordance with this invention. Accordingly, a plurality of additional relays are provided. Cross-connections are provided for connecting one or the other of these additional relays in series with each tens block relay and this additional relay, when operated, closes its contacts which are, in turn, connected to different ones of a plurality of unused conductors back to the marker. In accordance with the specific embodiment described herein, four such conductors are employed and one of them is connected to the contacts of each additional relay connected in series with the tens block relays. The marker is similarly provided with additional relays which respond to the operation of these additional relays so that in the specific embodiment described herein, each of these additional relays in the marker may close through ten of the ringing combination conductors to a group of ten relays or other indications in the marker. Thus, the ten ringing combinations selected may be expanded to forty combinations or translations, including the original ten. The other five ringing combinations normally provided are still employed for the more usual types of ringing.

On line numbers for stations reached by line link pulsing, the L to LL cross-connection referred to in the above articles, patents and patent applications in the number group is omitted. The terminating treatment mark is cross-connected to operate the LLP1 relay. The operation of this relay causes the HG and VG information to be used to operate a line route relay and the VF information to indicate the number of digits to be outpulsed to the satellite.

On line numbers assigned to the line circuits to the satellite the number group is cross-connected to give the line link location of the line circuit. The marker and number group are cross-connected to give the silent ringing level and a terminating treatment mark.

Thus, by appropriate additional cross-connections of a small number of relays, provision is made for obtaining a large plurality of additional translations which may be employed to operate route relays and give other indications to the marker circuit. The route relays themselves may also be employed to supply additional information to the marker. Specifically, the route relays may direct the marker to any specific auxiliary number group circuits such as 125 and direct the marker to hunt over the proper group of trunks to obtain the equipment number or location of an idle one of the trunks in this group. The equipment numbers obtained from the auxiliary number group circuits may be equipment numbers of the usual lines normally furnished in the main crossbar swtiching system, and thus in place of subscribers' lines, or they may be numbers in the number group or number system not normally assigned to the main switching equipment, and thus not in place of any of the usual numbers available for subscribers to the main switching system. The auxiliary number group will not be connected to the marker for the usual calls to subscribers and the marker will not respond to such auxiliary number groups unless it has already responded to one of the other number group circuits or unless a route relay has been previously operated. The route relays may also be employed to determine the number of digits to be outpulsed. They may also be employed to determine if an arbitrary digit is to be outpulsed and, if so, the character of this digit. The route relay may also determine the outsender class to be employed, i.e., the type of pulses to be transmitted.

Where large blocks of numbers regularly asigned to the main switching center are to be employed to designate stations on the PBX, a different translating arrangement may be provided.

In addition to the large number of additional translation required, it is most desirable to distribute the trunks to the various PBX switching systems as uniformly as possible over the various line link frames in order to prevent or reduce blocking and also to equalize the load on the various frames, markers, sender groups, and the like. However, in distributing these trunks over different frames, it is desirable to trunk hunt or search for idle trunks over the entire group without greatly increasing the marker holding time. If the marker holding time were too greatly increased then additional markers would have to be provided.

In order to arrange the circuits to expedite the hunting so the marker's holding time is not greatly increased, the senders of each group have been arranged to give an all-sender-group-busy indication, which indication is then employed to render busy the trunks to which the senders of this group are connectable. Thus, these trunks will not be selected by the marker should the marker hunt for an idle trunk in this group at this time. The make-busy circuits for making the various trunks busy when all of the senders in the group are connectable to the respective lines are arranged so that the various trunks are made busy both to the normal hunting arrangements in the marker and also to the block hunting arrangements wherein the marker will not hunt for an individual line in any group of ten trunks which are all busy. Instead, the marker will connect its hunting circuit and hunting relays only to those groups of trunks in which there is at least one idle trunk. In this manner, the holding time for the marker number hunting of a desired PBX trunk is greatly reduced so that the over-all marker holding time is not greatly increased.

In addition to the above features for transmitting signals to PBX's, or other switching centers having trunks on the line link side of the main switching system, it is also desirable to arrange the ringing switch or to set ringing in the incoming trunk so that no ringing current will be transmitted from the incoming trunk through the switching equipment and then over the PBX trunk. Instead, the incoming trunk should be set for either charging or noncharging as determined by the completing class of service or in any other desired fashion by the marker. This information as to how to control the ringing switch is also obtained by the marker from one or the other of the number group circuits or from the route relay selected as described above. In accordance with this invention an aditional level or position is provided on the ringing switch which, in effect, operates the ring trip relay and conditions the incoming trunk circuit to either respond to or fail to respond to an answer by the called PBX attendant or subscriber.

FIG. 3 shows the modifications to the number group circuits and the markers which cooperate to provide the increased and expanded translations required for the line link pulsing features in accordance with our invention. As shown in FIG. 3, the equipment to the left of the center line 323 is located in the marker while the equipment to the right of the center line 324 is located in the number group. The contacts between these two center lines 323 and 324 are in the number group marker connectors, such as 128, 129 and 130 of FIG. 2. Thus the equipment in the marker to the left of the center line 323 may be connected to any one of a large plurality of different number group circuits represented by the equipment to the right of the center line 324. Also a plurality of different markers may be simultaneously connected to different ones of these number group circuits. In asmuch as the number group marker connectors operate in their usual manner as described in the above-identified patents which are incorporated herein, such description is not repeated. The TBW relay 310 shown in the marker circuit is similar to the TBW relay shown in FIG. 178 of the above-identified Busch Patent 2,585,904. The operate circuit of the TBW relay 310 extends through the contacts of the PN, TN and PTN relays, which are shown in FIG. 151 of the above-identified Busch Patent. The operate circuit of this relay also extends through the various relay contacts as shown and through the number group connector contacts and then over one of the conductors TB0 through TB9 and then through one of the hundreds block relay contacts HB0 through HB9 to one of the TB relays. As indicated by the designation of the conductors 3270 and 3279 there are ten of these 10-block conductors. Likewise, there are ten hundreds block relay contacts HB0 through HB9 connected to each of these TB0 through TB9 conductors. From these relay contacts the circuits extend to one hundred TB relays, designated TB00 to TB99. Thus, one of the hundred of the tens block relays will be operated for each of the numbers received from the marker. There are one hundred such TB relays in each number group since the number group is individual to one thousand subscriber line designations or numbers. The right-hand winding terminal as shown in FIG. 3 of each of the TB00 through TB99 relays in accordance with the arrangements shown in the above-identified patents is connected to ground as, for example, by strapping terminals 338 and 334 together. However, in accordance with our invention, this terminal is not connected directly to ground. Instead, the right-hand terminal as shown in FIG. 3 of each of these 10-block relays extends to an individual cross-connection terminal, frequently called a punching, 334. Thus, there are one hundred of such connecting terminals and each one of them is cross-connected to the cross-connecting terminal such as 335. In the exemplary embodiment described herein, four such terminals 335 are provided, designated TBS0 to TBS3. However, any suitable number may be provided, depending upon the different traffic conditions and requirements of the system. Thus, in addition to operating some one of the TB relays, TB00 to TB99, each time the marker seeks a translation from a given number group, some one of the TBS0 to TBS3 relays will be operated in series therewith. Each one of these TBS0 to TBS3 relays is provided with a contact 313 which supplies ground to one of four conductors. These conductors, such as 3390 through 3393 extend through the number group connector contacts to a corresponding MTBS0 to MTBS3 relay in the marker. These relays are designated 3130 to 3133 in FIG. 3. Thus, when the TBW relay is operated, some one of the TB00 to TB99 relays, one of the TBS0 to TBS3 relays 3120 to 3123 and the corresponding one of the MTBS0 to MTBS3 relays 3130 to 3133 in the marker are operated. The operation of this relay is employed to change or increase the number of possible translations obtainable from a given number or request from the number group circuit.

As indicated in FIG. 3, a number of ringing combinations relays RCN- are provided, one for each of the RC ringing combinations 01, 06–08, 10 and 11. These conductors are represented by conductors 325 which are interconnected through the number group connector to the corresponding RCN- relays 321 in the marker, depending upon the connection to the RF terminal 349. The vertical file conductors are also connected to this RF punching 349 as indicated by the conductor 326, and designated VF0 to VF4. These conductors are connected in the marker in the usual manner, giving the vertical file number of the equipment number of the corresponding line.

Only the ringing combinations RC01, RC06–RC08, RC10 and RC11 are used in the above manner. The ringing combinations RC00, RC02–RC05, RC09, and RC12–RC15 are not usually used in this manner. These latter combinations are usually excluded because they are the combinations generally associated with one party, two party, and four party subscriber lines and for service on PBX terminal hunting.

The ringing combination RC04 for example extends over the conductor 328 to the RCN04 relay 315 in the marker. This relay operates in response to a request for translations wherein the cross-connections to the RC04 ringing combination are provided. The operation of this relay completes an obvious circuit for the operation of POTS relay 350 directing the operation of the marker and system to provide various special or additional services.

The operation of the RCN04 relay 315 also closes make contacts which complete circuits which extend to make contacts on each one of the MTBS relay (MTBS0 to MTSB3). Depending upon which one of these MTBS0 to MTBS3 relays is operated, the circuit from the RCN04 relay contacts will extend to a differnet one of the feature or controlling relays in the marker, such as 318, 319, etc. The particular one of these relays operated depends upon the various cross-connections within the marker from the contacts 340, 341, etc., of the MTBS0 to MTBS3 relays, as indicated in FIG. 3. For example, the relay 316 is designated "Centrex," indicating that this relay will designate the type of group operation described in the above-identified Fisher et al. patent application, wherein PBX stations are directly connected to the switching network of the main switching station described herein.

Relay 317 is designated DID, indicating direct inward dialing, thus indicating that the last portion of the PBX station identification is to be outpulsed over the PBX trunk from the line link side of the main switching network.

The generally used ringing combinations RC01, RC06, RC07, RC08, RC10, and RC11 are each used to operate the corresponding relays in the marker such as represented by relay 322. Each of the other ringing combinations RC00, RC02, RC03, RC04, RC05, RC09, RC12, RC13, RC14, and RC15 are also still available. Thus the RCT04 relay 3144 in the marker may for example be operated in response to the operation of the RCN04 relay 315 and the MTBS3 relay when cross-connected as shown in FIG. 3. Likewise the RCT05 relay may be operated in response to the operation of the RCN00 relay 313 and the MTBS0 relay.

The ringing combination RC04 is shown extending over conductor 328 to an RCN04 relay 315. The contacts of this relay similarly extend to circuit from the contacts 342, 343, etc., of the MTBS0 to MTBS3 relays in the marker and the contacts from one of these relays, depending upon which one is operated from the number group as described above, alternatively may be cross connected to extend to other route relays or to other relays representing information conveyed from the number group to the marker. These relays are designated 316, 317, 318 and 319 in FIG. 3. Thus, by properly connecting or cross-connecting the various cross-connection terminals provided as indicated in FIG. 3, and with four additional conductors from the number group to the marker, a large plurality of different translations may be transmitted from the number group to the marker circuit. Inasmuch as the TBS0 to TBS3 relays 3120 to 3123 are operated in series with the various TB relays, TB00 to TB99, all of the lines within a given 10-block which cause the corresponding TB00 to TB99 relay to operate, cause only one of the TBS0 to TBS3 relays to be operated. Thus, where different translations are required for different lines in a given 10-block, they must all be available from the operation of one of the TBS0 to TBS3 relays. However, it is not necessary that all of the lines in the 10-block have or require the same translations. Some of these lines may be PBX lines and others of them may be individual or party lines.

In establishing a call to a PBX station, such as 105 in FIG. 1, and assuming such a call originates in another central office, the directory number station identification will be received from an incoming trunk, such as 140, and conveyed to the marker 150 in the usual manner as described in the above-identified patents. The marker, upon receiving this number from the incoming register 137 through the incoming register marker connector 148, then calls in a number group circuit, such as number group 126, through the connector 129. Inasmuch as the number received by the marker will be a directory number group 126 will be one of the regular or normal number group circuits.

As described in the above-identified patents and application, a number group circuit is provided for each thousand subscribers' lines or, more specifically, for each thousand directory numbers to which calls may be completed by the marker or marker group represented by marker 150. Thus, in a 10-thousand line office, there will be ten such number group circuits. In exceptionally large offices, three or four times this number of number groups may be provided where the marker group may complete calls to lines or stations of such a group. Such number groups are required for obtaining translations so that the marker may determine the physical location of the desired outgoing subscriber's line. In the past, PBX trunks also were represented by numbers in such number groups which rendered these numbers unavailable to other subscribers. The individual PBX stations, however, are not represented by any of the numbers in these number groups since they had to be reached first over the PBX trunk to an operator located at the PBX who would then dial or key the PBX station number into the automatic PBX switching equipment.

In accordance with our invention the individual PBX stations must now be represented by numbers in the normal number groups at the central switching station, such as number group 126. However, in accordance with the present arrangement the PBX trunks need not be represented by numbers in such number groups. Instead, they may be represented by numbers or translatiton points in one or more auxiliary number group circuits such as number group circuit 125. Thus, each of the PBX trunks do not render any of the available station or directory numbers unavailable. They do not require such numbers.

In response to a call such as assumed above, the marker will first pick a number group in the usual fashion in response to the office code plus the thousands digit.

Considering the most general arrangement first, the complete directory number will then be translated by the number group and a route relay operated. Thus, the entire PBX station designation will be employed to pick or select the proper route relay. This selection will be in response to the operation of the circuits of FIG. 3 as described above. Thus, when the TBW relay 310 and one of the TB relays TB00 to TB99 are operated one of the TBS0 to TBS3 relays will also be operated. The particular TB relay operated is selected by the number of the called station as received by the marker and the particular TBS relay determined by the cross-connections between the selected TB and TBS relays.

The particular ringing combination and the particular one of the TBS0 to TBS3 relays operated as determined by the cross-connections will, in turn, cause a corresponding relay, such as relay 3130, to be operated in the marker circuits due to the various cross-connections described above with the result that the ringing combination designated by the cross-connections in the number group circuit will be employed to operate the proper feature or controlling relay such as 318 or 319. Such a relay for example has its contacts connected in such a manner as to recycle a marker in the normal fashion and cause the marker to select an auxiliary marker number group circuit such as 125 and designate the number or location in this number group of the first of the group of trunks extending to the PBX 112 through which the call from the central office must pass in order to reach the PBX station 105. Prior to the selection of the auxiliary number group the first number group circuit may also indicate to the marker the number of digits to be dialed or outpulsed by the marker when a connection is established to a selected trunk to the PBX. Alternatively, the route relay selected in the manner described above may convey this information to the marker by means of cross-connections from its contacts. This route relay indicates to the marker the first trunk for which the marker must trunk hunt and also causes the sleeve-connect SC relay such as 330 in the number group circuit to be operated indicating to the marker that the marker should connect its test leads to the sleeves of the first of any group of ten trunks extending to the PBX 112. Similar sleeve-connect relays and related circuits are designated SC1 and SC2 and are shown in FIG. 19 of the above-identified Busch Patent.

The marker will then select the first idle one of these trunks or, if they are all busy, it will disconnect the test circuit from these sleeves and connect it to the sleeves of the next ten trunks until all of the trunks are tested. If all of the trunks are busy then a busy signal will be returned to the calling subscriber in the normal manner. If any trunk is idle the marker will obtain the equipment number or line location of this trunk on the line link frames from the auxiliary number group circuit such as 125 and thereafter establish connection from the incoming trunk termination 139 to the selected PBX trunk.

At the same time, due to the operation of the route relay and the information received from the number group circuits, the marker will operate the appropriate outgoing sender connector such as 133 or 134 and the outgoing sender link, such as 119 or 120, and cause an idle sender of the sender group which serves the selected outgoing PBX trunk to be connected to this trunk. The marker also causes the called station number or portion thereof to be transmitted to the selected sender and then the sender to be conditioned to properly transmit the required portion of this number over the outgoing trunk to the PBX equipment.

In the exemplary embodiment assumed above, the number groups or route relay directs the marker and the marker in turn directs the sender to prefix a predetermined digit, such as 7. This digit is then outpulsed to the PBX equipment 110 prior to the transmission of the directory number or designation received from the incoming trunk 140. This digit causes the PBX equipment 112 to select a tie line 147 to the PBX 114. Thereafter the sender will transmit the required digits dialed by the calling subscriber's station. Depending upon the size of the PBX 114, the last two, three or four digits of the PBX station identification number will be transmitted by the sender to the switching equipment at PBX 114, first over the trunk to the PBX 112, through this PBX switching equipment and then over the tie line 147 to PBX 114.

Since PBX trunks usually handle a large number of calls, it is desirable to distribute these trunks over a number of line link frames. The outpulsing over the PBX trunks requires that the marker control the attachment of suitable senders to the selected idle out trunk and also properly transmit information to and condition the senders for subsequent outpulsing of the necessary information. This trunk hunting and control of the senders tends to increase the marker holding time. In accordance with our invention the increase in marker holding time is decreased to a minimum by improved trunk hunting and sender busy circuits. Thus, we provide an all sender busy circuit which makes the trunks busy when all the senders of the group of senders connectable to the various trunks are all busy so that the marker will not select any one of these trunks and later find that the senders are all busy and have to recycle to hunt some other trunk. In other words, when the marker finds an idle trunk this indicates to the marker that a sender is idle which may be employed to outpulse over the idle trunk. The marker then finds such a sender and connects it to the idle trunk.

The senders are arranged in groups as in the previous arrangements wherein the senders are connected to the trunk line frames instead of the line link frames. As before each group of senders is arranged in an A subgroup and a B subgroup which the marker may select in a manner described in the above patents and articles.

In the exemplary embodiment described herein, the senders are arranged in six such main groups designated 0 to 5 and each main group is divided into a subgroup A and a subgroup B. In smaller switching centers there will be a lesser number of groups of senders while in larger offices there may be a larger number of groups of outpulsing senders to outpulse to PBX trunks or other lines connected to the line link frame.

The sender group 0 and sender group 5 are shown in FIG. 4 and these sender groups are divided into subgroup A and subgroup B. The sender group 0, subgroup A is designated 405 and shows the busy circuit of two senders. The busy circuit of each sender includes a series circuit through two break contacts. This series circuit extends through break contacts ASB1 of the sender busy relay and through the break contacts AMB1 on the sender make busy relay in the subgroup A of sender group 0 designated 405. The second circuit extends through break contacts on the ASB2 relay and AMB2 relay. While two such series circuits are shown, one for each of two senders, a similar circuit will be provided for each sender in this group, the two circuits shown being representative of corresponding circuits of the other senders in this group.

The break contacts of each of these relays are normally closed when the corresponding sender is idle. When the sender becomes busy by being employed to outpulse over a trunk, then the ASB1 relay, for example, will operate and interrupt the series circuit through this sender. Similarly, if a sender is made busy by means of a key or other equipment to permit maintenance or for any other reason, then the AMB1 contact will be opened and this will interrupt the series busy circuit through this sender.

The series circuits through each of the senders of subgroups are connected together in multiple and extend to sender busy and alarm circuit 406. The circuit from the subgroup A of sender group 0 extends to a decoupling diode 401 and then to the SB0 relay winding. A similar circuit extends through the various sender busy circuits in the subgroup B of sender group 0 to the decoupling diode 402. The diodes 401 and 402 are employed to prevent interference between these circuits of the two subgroups of senders which have other branches extending to the marker in the usual arrangement described in the above patents, patent applications and articles.

Diodes 401 and 402 when connected as shown in FIG. 4 are sometimes called an OR circuit.

Thus, the sender busy relay SB0 is operated in the sender busy and alarm circuit so long as any sender in either subgroup A or subgroup B of sender group 0 is idle. If all of the senders in both of these subgroups become busy, then the circuit through the winding of relay SB0 may become interrupted and the relay released.

A similar relay is provided for each of the other sender groups. As long as any sender in the associated group is idle corresponding relays SB0 through SB5 will be operated. When the last sender in each group becomes busy the corresponding relay releases. The SB5 relay and its related circuits including the busy circuits in the senders of the corresponding group 5 subgroup A and subgroup B are similarly shown in FIG. 4. Inasmuch as these circuits are all substantially identical only two of these, the first and last, have been shown in FIG. 4. However, one such relay will be provided for each sender group provided in the switching center.

Each of these SB relays, SB0 through SB5, is provided with break contacts such as 407 and 408 which contacts are connected in parallel. Inasmuch as these relays SB0 through SB5 are all normally operated so long as any sender in corresponding sender group is idle, the break contacts will normally be open. These break contacts are connected to the winding of the alarm relay AL. However, since they are all normally open the alarm relay AL is normally released. When all of the senders of any of the sender groups become busy then the corresponding relay such as SB0 releases and completes a circuit for the operation of the alarm relay AL. This relay actuates alarm circuits in any desired manner known in the prior art.

In addition, the operation of the AL relay together with the release of some one of the SB0 through SB5 relays cause the operation of the corresponding sender group relay SG0 through SG5. For example, if all of the senders of group 0 become busy then relay SB0 releases and closes the break contacts 407, thus causing relay AL to operate. As a result a circuit will be completed from ground through the operated make contacts on relay AL and break contacts on relay SB0 to battery through the winding of relay SG0 which causes relay SG0 to operate indicating that all of the senders in group 0 are busy.

The operation of relay SGO causes its make contacts 409 to close and complete an obvious circuit for the operation of the link sender busy relay 410. This link relay is located on the outsender link frame and is provided with an individual make contact for each of the out trunks to which the senders of this 0 group may be connected. Two such contacts are shown in FIG. 4 designated LSB00 and LSB09. When the LSB0 relay operates the various contacts controlled by it also operate and cause a make busy relay MB0, MB9, etc., in the corresponding trunk or line link pulsing line circuit to be operated. The busy relay MB0 operates a set of transfer contacts designated 411 which interrupts the −48 volts extending to the LS0 terminal and applies ground to the terminal. This LS0 terminal is interconnected to the number group circuit terminal NS0 which extends through operated contacts of the sleeve-connect relay SC0 and then through operated contacts of the number group connector to the busy test circuit in the marker. When the marker is searching for an idle trunk it is looking for the −48 volt battery connected to the sleeve of the various trunk circuits. Consequently, if the MB0 relay is operated, battery is removed and ground is connected to the sleeve and thus to the LS0 terminal which indicates that this trunk or line circuit associated with the corresponding trunk is busy. In other words, this circuit will test busy to the marker, if all of the senders in the sender group serving this trunk or line circuit are busy even though the trunk or line circuit is in fact idle. Thus, the marker will not select this idle trunk if all the outsenders which serve this trunk are busy.

A second line link outpulsing circuit or trunk circuit is shown in FIG. 4, similar to the one described above. This circuit comprises the make busy relay MB9 which is operated from the LSB09 contacts on the outsender link frame. The operation of relay MB9 causes the corresponding contacts 412 to be operated which removes battery from the LS9 terminal and applies ground thereto. This terminal is connected to the NS9 terminal in the number group circuit which in turn extends through the sleeve-connect relay contacts SC9 and then through contacts in the number group connector relay to the S9 conductor to the marker.

As shown in FIG. 5 in the above-identified article entitled "Number Group Frame for No. 5 Crossbar" by J. O. Morzenti, the conductors S0 through S9 extend to the marker circuit as shown in FIG. 4. These conductors are in effect the sleeve conductors of the respective trunks extending to the called subscriber's PBX or switching system. In the marker these conductors extend to the windings of the sleeve test relays SL0 through SL9. Relays SL0 and SL9 are shown in FIG. 4. Similar relays SL0 through SL9 and related circuits are shown in FIGS. 168 and 189 of the above-identified Busch patent.

When a connection is established over these conductors through contacts of the SC relay in the number group circuit and through the make busy relay contacts in the trunk or line circuit and the contacts of the marker connector relays as shown, the sleeve relays SL0 through SL9 are operated providing, of course, the trunk or line circuit is idle. If the line or trunk circuit is busy then the corresponding MB relay such as MB0 will be operated and remove the operating battery from the corresponding sleeve relay such as SL0 which relay does not operate over these conditions. If some one or more of these sleeve relays SL0 through SL9 operate then the marker will select a trunk to which some one of them is connected by means of a chain of preference circuits in the usual manner as described in one or more of the above-identified patents, patent applications or articles.

When one of the trunks or lines is selected in this manner the location of the selected line or trunk on the line link frames is transmitted from the number group circuit to the marker in the usual manner so that the marker can set up a connection to this selected trunk.

If none of the line or trunks are idle and there are more such lines or trunks, a marker will advance and cause another group to be tested in the normal fashion, or else a marker will advance and test the trunks in blocks of 10 trunks and then cause the sleeves of some group of 10 trunks in which there is an idle trunk to be connected to the marker and the above-described operations repeated and a connection established to the selected idle trunk.

Each of the individual make busy relays in the line link trunk or line circuits such as MB0–MB9, etc., in addition to removing battery from the sleeve and applying ground thereto, when the corresponding trunk or line becomes busy or when all of the senders serving this group of trunks becomes busy, closes a make contact such as 415 for the relay MB0 and 416 for the relay MB9. These contacts are included in a series chain circuit. Ten such relay contacts are included in each series circuit providing there are ten trunks or lines in a PBX group. If there are more than ten trunks then a similar series circuit will be provided for each group of ten of the PBX trunks in the PBX group. This series circuit is provided to permit the marker to group hunt over the various groups of ten trunks. If all of the trunks of the first group of ten trunks are busy then the marker will cause the number group circuit to advance in the usual manner and, if there are more than the predetermined number additional trunks such as for example if there are more than ten addition trunks, then the marker will trunk hunt in groups called block trunk hunting. The above-described chain circuit is provided for such hunting. If any one of the ten trunks in the group are idle then the corresponding contacts such as 415, 416, etc., are open so that the TBT- relay 417 in a number group circuit will not be operated. Under these circumstances, the marker will then connect the S0 to S9 leads to sleeves of this group of ten trunks and search for the idle trunk in this group.

If, however, all ten trunks are busy then the above-described chain circuit through contacts 415, 416 etc., will be closed and complete a circuit for the operation of a TBT- relay, such as 417, in the number group circuit. This relay in turn operates and indicates to the marker that all ten trunks in this particular group of trunks are busy. The marker will then advance and test a corresponding TBT- relay serving the next group of ten trunks until a group of ten trunks is found having at least one idle trunk therein. The marker will then proceed in the normal fashion to connect the S0 through S9 conductors to the sleeves of these trunks through the number group connector and through a sleeve-connect relay SC in the number group circuit in a manner described above. When the trunks to a given PBX are distributed to a number of different number group circuits contacts on the TBT relays in each number group circuit will be connected in a chain circuit which extends to an allotter circuit in the marker so the marker will select a number group having an idle trunk to the desired PBX.

The various MB relays and the individual trunks or line circuits are operated both in response to a busy condition of the respective trunks and also in response to a busy condition of all the senders serving this group of trunks. The marker will pass over this group of trunks if they are all busy either in response to a call or if they are idle but all the senders serving such trunks are busy. Thus, in accordance with our invention the marker will not attempt to search the individual trunks of any group of ten trunks if all of these trunks are busy due to either the handling of the call or due to the fact that no outsender is available to outpulse the necessary dial or switching signals over the trunk. Thus, the marker will not seize any individual trunk if it is busy or if all the senders serving this trunk are busy and neither will it seize any block or group of trunks if all of the individual trunks in the group are busy or have no senders available to outpulse the switching signals over the individual trunks of the group. Thus, in accordance with our invention the time required by the marker to search for an idle trunk with an available idle sender is apreciably reduced so that the over-all hold time of the marker is not greatly increased by the additional operations required for outpulsing the calling signals over the PBX trunk or lines.

It is to be understood that the above-described arrangements are illustrative of the application of the principles of our invention. Numerous other arrangements may be devised by those skilled in the art without departing from the spirit and scope of our invention.

What is claimed is:

1. In combination in a telephone switching system, a switching network comprising a plurality of subscribers' line terminals and also a different plurality of trunk terminals, characterized in that means are provided for transmitting calling signals over outgoing lines from selected ones of said subscribers' line terminals including outpulsing senders and means for selectively connecting said outpulsing senders to the selected ones of the subscribers' line terminals, and also including translating means responsive to the last portion of the calling signals for conditioning said sender to selectively transmit calling signals to said selected subscribers' line terminals.

2. In combination in a telephone switching system, a switching network comprising a plurality of line terminals, telephone lines connected to said line terminals, a plurality of trunk terminals included in said network, a plurality of trunks connected to said trunk terminals, means for selectively establishing telephone paths through said network between selected ones of said line terminals and any one of said trunk terminals, means independent of said switching network for transmitting telephone switching signals to selected ones of said line terminals, a plurality of outpulsing senders, and means for selectively connecting said outpulsing senders to selected ones of said line terminals, and auxiliary translating means for selecting an idle one of said line terminals which has an idle one of said outpulsing senders available.

3. In combination in a telephone switching system, a switching network comprising a plurality of line terminals, telephone lines connected to said terminals, a plurality of trunk terminals connected to said network, a plurality of trunks connected to said trunk terminals, switching means responsive to telephone switching signals for selectively establishing paths through said network between selected ones of said line terminals and selected ones of said trunk terminals, a plurality of outpulsing senders, means included in said switching means for selectively connecting one of said outsenders with selected ones of said line terminals independently of paths established through said network by switching means, and other means included in said switching means responsive to received telephone switching signals for conditioning said sender to outpulse a predetermined number of digits to said selected line terminals.

4. In combination in a crossbar telephone switching system, a switching network comprising a plurality of line terminals and a plurality of trunk terminals, means including a marker for selectively establishing connections between selected ones of said line terminals and selected ones of said trunk terminals, a plurality of outpulsing senders arranged in groups, and means including said marker for selectively establishing connections between individual ones of groups of said senders with individual ones of groups of said line terminals independently of said switching network, said marker also including means responsive to calling signals for conditioning selected ones of said senders to selectively transmit a predetermined number of received calling signals to said selected line terminals.

5. In combination in a telephone switching system, a switching network comprising a plurality of line terminals and a plurality of trunk terminals, control means for selectively establishing connections between selected ones of said line terminals and selected ones of said trunk terminals, a plurality of outpulsing senders arranged in groups, means including said control means for selectively establishing connections between individual ones of groups of said senders with individual ones of groups of said line terminals independently of said switching network, said control means also including means responsive to calling signals for conditioning selected ones of said senders to selectively transmit a predetermined number of received calling signals to said selected line terminals, and means responsive to a busy condition of all of the senders of said sender groups for preventing the establishment of a connection by said control means to any of the line terminals to which said busy sender group is connectable.

6. In combination in a telephone switching system, a switching network comprising a plurality of line terminals and a plurality of trunk terminals, control means responsive to received telephone switching signals for selectively establishing connections between selected idle ones of said line terminals and individual ones of said trunk terminals, a plurality of outpulsing senders arranged in groups, connecting means independent of said switching network for connecting the individual senders of said groups of senders to individual ones of groups of said line terminals, and busy means responsive to a busy condition of all of the senders of one of said groups of senders for making busy the individual line terminals connectable to the senders of said group of all-busy senders.

7. In combination in a crossbar telephone switching system a switching network comprising a plurality of line terminals and a plurality of trunk terminals, control means including a marker for selectively establishing connections between selected idle ones of said line terminals and an individual one of said trunk terminals, outpulsing senders arranged in groups, means for selectively connecting an individual one of said senders of one of said groups with individual ones of groups of said terminals, and means responsive to the busy condition of all the senders of a group for preventing the selection of any of the terminals connectable to the senders of the all-sender-busy group by said marker.

8. In combination in a crossbar telephone switching system, a switching network comprising a plurality of line terminals and a plurality of trunk terminals, subscribers' stations connected to said line terminals, each of said terminals identified by a unique group of telephone switching signals designating a called subscriber, control means including a marker for selectively establishing connections between selected ones of said line terminals and any one of said trunk terminals, a plurality of route relays in said marker, means responsive to all telephone switching signals of a said group for selecting one of said route relays, and means responsive to the operation of said one route relay for selecting an auxiliary translating circuit for selecting an idle one of a group of line terminals assigned to the called subscriber.

9. In combination in a crossbar telephone switching system, a switching network comprising a group of line terminals, subscribers' stations connected to said line terminals each identified by a director number individual thereto, plurality of trunk terminals also included in said switching network, control means including a marker responsive to telephone switching signals representing said station identifying numbers, translating means individual to each of said station identifying numbers for directing said marker to the location of the line terminals connected to the identified station means, including route relays responsive to certain of said identifying numbers for indicating that a group of lines extend to a subscribers' station, and means responsive to said route relays for selecting auxiliary translating means independent of said identifying number translating means for indicating to the marker the line location of an idle one of said selected group of terminals connected to said subscribers' station.

10. In combination in a telephone switching system, a switching network comprising a plurality of line terminals, a plurality of subscribers' stations designated by numbers individual thereto connected to individual ones of said line terminals, other of said subscribers' stations including telephone switching equipment interconnected with a group of said line terminals, control means for selectively establishing transmission paths through said network to said line terminals, means responsive to received signals designating said subscribers' stations, translating apparatus connected to said control means and responsive to said received signals for identifying said individual terminals or said groups of terminals, and auxiliary translating means connectable to said control means for identifying individual terminals in said groups of terminals.

11. In combination in a telephone switching system, a switching network comprising a plurality of line terminals, a plurality of calling numbers each individually assigned to one of said terminals, other calling numbers assigned to groups of said terminals, control apparatus for selectively establishing transmission paths through said network to said line terminals, translating means connectable to said control means responsive to received signals representing said calling numbers for identifying said individual ones of said line terminals or an individual group of said groups of terminals and auxiliary translating means connectable to said control means in response to said individual group being identified for identifying and selecting idle ones of the terminals of said identified group of terminals.

12. In combination in a telephone switching system, a switching network, a plurality of terminals connected to said network, control means for controlling the establishment of paths through said network to said terminals, means responsive to received signals, translating equipment connectable to said control means and responsive to said received signals for setting said control means to control the establishment of said paths through said switching network and additional translating means included in said translation means for changing the translations and setting of said control means in response to predetermined received signals.

13. In combination in a telephone switching system, a switching network comprising a plurality of line terminals, busy test means for testing the idle or busy condition of said terminals, control apparatus for selectively establishing paths through said network from said line terminals, a plurality of senders connectable to said line terminals by said control means, and means responsive to a busy condition of all of the senders connectable to one of said terminals for making said terminal test busy.

14. In combination in a telephone switching system, a switching network comprising a plurality of line terminals, control means for selectively establishing connections through said network to said line terminals, means responsive to received signals for directing said control means, translation equipment connectable to said control means and responsive to said received signals, a plurality of route relays included in said control means each for directing said control means to establish a connection to one of a predetermined group of said terminals, a plurality of senders each connectable to selected ones of said line terminals over paths independent of said switching network, and means responsive to different ones of said route relays for conditioning said senders to transmit different signals to said one of said terminals.

15. In combination in a telephone switching system, a switching network comprising a plurality of line terminals, control means for selectively establishing connections through said network to said line terminals, means responsive to received signals for directing said control means, translation equipment connectable to said control means and responsive to said received signals, said translation equipment including means responsive to predetermined received signals to select predetermined groups of translations, a plurality of route relays included in said control means each for directing said control means to establish a connection to an idle one of a predetermined group of said terminals, a plurality of senders each connectable to selected ones of said line terminals over paths independent of said switching network, and means responsive to different ones of said route relays for conditioning said senders to transmit different signals to said one of said terminals.

16. In a telephone switching system, a switching network, a plurality of line terminals and a plurality of trunk terminals connected to said network, a plurality of subscriber lines connected to certain of said line terminals, at least one PBX system connected to other of said line terminals, said PBX system having individual extension lines connected thereto, a plurality of senders connectable to said line terminals, and control means for controlling the establishment of paths through said network between said trunk terminals and said subscriber line terminals responsive to first received signals and between said trunk terminals and said other terminals responsive to second received signals, said control means including first translating means responsive to said first and second received signals, additional translating means responsive to said second received signals and to operation of said first translating means for translating said second received signals, and connector means for connecting an idle one of said senders to one of said other line terminals.

17. In a telephone switching system, the combination of claim 16 further comprising means responsive to a busy condition of all the senders connectable to one of said other line terminals for making said one other line terminal test busy.

18. In a telephone switching system, the combination of claim 17 further comprising means for establishing a connection between one of said senders and any of said other line terminals independent of said switching network and means for conditioning said one sender to transmit calling signals to said other line terminals dependent on the last portion of said second received signals.

19. In combination in a telephone switching system, a switching network comprising a plurality of line terminals, a plurality of calling numbers each individually assigned to one of said terminals, other calling numbers assigned to groups of said terminals, control apparatus for selectively establishing transmission paths through said network to said line terminals, translating means connectable to said control means responsive to received signals representing said calling numbers for identifying said individual ones of said line terminals or an individual group of said groups of terminals, connector means activated in response to the identification of said individual group and separate auxiliary translating means connected to said control means by said connector means for identifying and selecting idle ones of the terminals of said identified group of terminals.

No references cited.

KATHLEEN H. CLAFFY, *Primary Examiner.*

WILLIAM C. COOPER, *Examiner.*